United States Patent Office 3,205,096
Patented Sept. 7, 1965

3,205,096
DEFERRED ACTION BATTERY
Harold N. Honer, Wonewoc, Wis., assignor to The Electric Storage Battery Company, Philadelphia, Pa., a corporation of New Jersey
No Drawing. Filed Dec. 18, 1961, Ser. No. 160,273
10 Claims. (Cl. 136—100)

This invention relates to deferred action batteries. More particularly, the invention relates to water activated deferred action primary batteries having cathodes comprising compounds which yield cuprous ions in conjunction with acid or neutral electrolytes.

Deferred action batteries using the system magnesium-cuprous chloride are well known and have been in commercial use for a variety of applications requiring a large output of electrical energy in relation to the weight of the battery. One principal use is with radio equipment carried by meteorological balloons. Batteries of this type are customarily manufactured in the dry state and are activated immediately prior to use by the addition of tap water or aqueous salt solutions. The cathode is formed by depositing cuprous chloride paste on a supporting screen or grid or by pressing cuprous chloride to form a compacted pellet. A thin sheet of magnesium forms the anode while a bibulous separator adapted to hold the cell electrolyte on activation is interposed between the two electrodes. It is desirable in batteries of this type that the activation time—that is, the time required to attain operating voltage on addition of water, be as short as possible. It is also highly desirable that overheating on discharge be avoided in order to prevent boiling off of electrolyte and wasteful dissipation of energy as heat.

It is therefore a principal object of the invention to provide a deferred action battery having a more rapid activation rate and less overheating on discharge.

It is a further object of the invention to provide a novel and improved deferred action battery which is capable of supporting heavier drains.

A further object of the invention is the provision of a novel deferred action battery from which higher voltages are obtained throughout entire discharge.

Another object of the invention is to provide a new and improved deferred action battery with greatly improved cathode utilization.

These and further objects and advantages of the invention will be apparent to those skilled in the art to which it relates from the following description of the preferred embodiments of the invention.

Broadly, the invention contemplates a water activated deferred action battery having a cathode comprising a mixture of a compound yielding cuprous ions in an acid or neutral electrolyte and a substance selected from the group consisting of sulfur, selenium and tellurium. In a preferred embodiment cells were constructed with a mixture of cuprous chloride and sulfur forming the cathode and magnesium sheets as anodes. Upon activation, these cells reached operating voltage more rapidly than control cells having conventional magnesium-cuprous chloride formulation. During discharge the cells of the present invention exhibited higher voltage per cell during the entire discharge and longer life under load. In addition, cells with the mixture of cuprous chloride and sulfur exhibited less overheating during discharge than the control cells.

The addition of sulfur to electrode materials has long been known to have beneficial results. Erwin, in Patent No. 1,282,057, teaches that additions of from 1% to 5% of sulfur to the Zn-CuO alkaline Lalande cells produces an increase in initial voltage. However, as increasing amounts of sulfur are added, the initial increase in voltage level becomes less and the effect does not persist. These cells have in certain relatively short-term applications increased service life as a result of the sulfur acting as the depolarizer in alkaline electrolyte. However, undesirable effects are introduced with such high amounts of sulfur due to the solubility of sulfur in alkaline electrolyte affecting the zinc electrode and producing a lower operating voltage due to the electrochemical action of the sulfur. Morehouse and Glicksman in Patent No. 2,759,986 describe the use of a sulfur cathode in combination with a magnesium anode and indicate that a sulfur cathode is advantageous because of its high theoretical capacity and voltage. The sulfur-magnesium cell is stated as providing a potential of 1.90 volts. In a later paper published at page 651 of the July 1960 Journal of the Electrochemical Society, Morehouse and Glicksman report the operating voltage under load of the magnesium-sulfur system as 0.90 to 0.95 volt per cell. Discharge data showing open circuit voltage of the magnesium-sulfur cell ranging between 1.60 and 1.65 volts per cell is explained as being due either to air absorbed in the cathode mix or to the small amounts of alkali or alkaline earth chromate or dichromate added to inhibit the corrosion of the magnesium.

I have now discovered that the addition of sulfur in acid or neutral solutions in the presence of cuprous ions produces an effect entirely different from the prior art teaching in providing a sustained high level voltage during the entire period of discharge. In accordance with the present invention this effect of sustained high level voltage is increased with increasing amounts of sulfur whereas in the prior art use of sulfur in the CuO-alkaline system the voltage level under load is reduced as the amount of sulfur is increased.

Measurements of half-cell potential as increasing amounts of sulfur are added to the CuO-alkaline system are shown below:

| | Volts |
|---|---|
| CuO+0% S | −0.22 |
| CuO+5% S | −0.07 |
| CuO+16% S | −0.18 |
| CuO+29% S | −0.23 |

These values were obtained using 30% KOH electrolyte and were measured against a HgO reference electrode. These data confirm that in alkaline solutions in which the sulfur is very soluble, as increasing amounts of sulfur are mixed with the cupric oxide cathode, the system becomes dominated by the voltage of the couple $S/S^=$. This couple has a half cell potential of −0.35 volt.

In acid or neutral solutions the sulfur couple is $S/H_2S$ which has a half cell potential of +0.12 volt. This couple polarizes very rapidly and hence will not support sufficient current to be of practical importance. I have now discovered that when sulfur is mixed with a compound yielding cuprous ions in the presence of an acid or neutral electrolyte, the sulfur and cuprous ions form couples which produce greatly improved performance during discharge. For example in an acid or neutral solution a mixture of cuprous chloride and sulfur produces the following couples which have the indicated single electrode potentials as measured in reference to a saturated calomel electrode:

| | Volts |
|---|---|
| Cu/CuCl | −0.136 |
| and | |
| CuS/Cu⁺ | +0.23 |

The latter couple dominates the system, and a large amount of sulfur does not affect is greatly. Hence, the overall reaction is $$Cu^+ + S + e \rightarrow CuS$$

In the presence of moisture on open circuit the reaction $$2CuCl + S \rightarrow CuS + CuCl_2$$

proceeds until $CuCl_2$ reaches $10^{-2}$ molar. This small amount of $CuCl_2$ promotes faster activation due to the increased quantities of $Cu^{++}$ and $Cl^-$ ions in solution.

X-ray studies of cathode structures comprising mixtures of cuprous chloride and sulfur in accordance with the present invention have shown that small quantities of CuS are present initially and as the sole end product of discharge. Visual inspection of cells made with a mixture of cuprous chloride and sulfur following discharge shows the cathode pellet to be uniformly black due to the presence of CuS with slight, if any, migration of CuS into the separator adjacent to the cathode pellet. In control cells formed with conventional cuprous chloride cathodes following discharge a high concentration of copper is present at the surface of the pellet and in the separator. In addition, finely divided metallic copper was observed on the surface of the magnesium anode. In the case of the sulfur-cuprous chloride mixture, the sulfur reacts with the $Cu^{++}$ ions to form CuS and thereby lessens the migration of copper ions which reduces the overheating caused by the parisitic reaction of $Cu^{++}$ ions with the magnesium electrode.

The overall reaction occurring at the cathode on discharge $$CuCl + S + e \rightarrow CuS + Cl^-$$

indicates that maximum beneficial results would be produced by stoichiometric proportions of sulfur and cuprous chloride. To illustrate this feature of the invention a series of cathode compositions were prepared by mixing 60.9 parts of cuprous chloride and 3.5 parts of mercurous chloride with 0, 5, 10, 15, 20, 25, 30, 35, 40 and 45 parts of sulfur. The mixes were heated at 112–115 degrees C. until the sulfur was completely melted. The mixes were cooled and ground to 24 x 24 mesh. 5.6 parts of graphite were added to each mix with thorough mixing. Mix pellets were pressed from the mix and assembled in cells with magnesium anodes. The cells were tested in B sections of BA–259/AM batteries, the minimum required voltage of which is 95 volts. Each B section comprised 64 cells. The batteries were discharged through a resistance equivalent to 48 ohms per cell. The test ended when the voltage of the 64 cell section fell to 95 volts. Voltage readings for batteries having the various sulfur percentages in the mix were made during discharge. The voltages per cell under load are shown in Table I.

TABLE I

*Voltage per cell under load*

| Percent Sulfur | Time After Activation | | | | | | Life in Minutes |
|---|---|---|---|---|---|---|---|
| | 10 Min. | ½ hr. | 1 hr. | 1½ hr. | 2 hr. | 2½ hr. | |
| 0 | 1.46 | 1.31 | 1.34 | 1.41 | 1.40 | 1.25 | 0 |
| 6.7 | 1.48 | 1.64 | 1.77 | 1.73 | 0.90 | | 97 |
| 12.5 | 1.52 | 1.67 | 1.78 | 1.63 | 0.92 | | 100 |
| 17.7 | 1.48 | 1.65 | 1.80 | 1.75 | 1.26 | | 111 |
| 22.2 | 1.48 | 1.66 | 1.80 | 1.73 | 1.49 | | 121 |
| 26.3 | 1.53 | 1.66 | 1.78 | 1.79 | 1.75 | 1.53 | 155 |
| 30.0 | 1.55 | 1.65 | 1.76 | 1.78 | 1.75 | 1.63 | 165 |
| 33.4 | 1.50 | 1.63 | 1.72 | 1.76 | 1.74 | 1.63 | 166 |
| 36.3 | 1.45 | 1.59 | 1.67 | 1.72 | 1.69 | 1.57 | 162 |
| 39.2 | 1.51 | 1.62 | 1.71 | 1.72 | 1.65 | 1.45 | 145 |

Examination of the test results shows that as the percentage of sulfur in the cathode mix is increased, the cells reach operating voltage more rapidly. Moreover, the voltage level per cell during discharge is higher and this higher voltage is maintained during the entire discharge with increasing amounts of sulfur. Finally, the service life of the cell is significantly increased by increasing proportions of sulfur in the cathode. The data indicates that maximum improvement is shown with additions of sulfur of about 30% rather than with the stoichiometric proportions of 24.5% sulfur as indicated by the discharge reaction. Evidently the theoretical efficiency is not realized due to the inability of the sulfur to contact the entire surface of the cuprous chloride and as a result, somewhat higher than theoretical amounts of sulfur are required. In practicing the present invention additions of from about 5% to about 40% by weight of sulfur are beneficial. The maximum benefit is achieved with additions of sulfur of about 30%. The use of amounts of sulfur less than 5% produces an initial increase in voltage, but there is very slight increase in cell life. Addition of sulfur in amounts greater than 40% by weight produces no beneficial effects and appears to reduce the cell capacity for given cathode weights by reducing the amount of cuprous chloride present in the mix.

The ability of cells in accordance with the present invention to support heavier drains is apparent from examination of the data in Table II. Test cells having cathodes comprising a mixture of 30% sulfur by weight and cuprous chloride and having magnesium anodes and control cells having no sulfur were compared under various current densities. The results of these tests are shown in Table II.

TABLE II

| Closed Circuit Voltage | Current Density— Amps./In.² | |
|---|---|---|
| | Control | Sulfur Mix |
| 1.33 | 0.16 | 0.72 |
| 1.25 | 0.34 | 0.86 |
| 1.15 | 0.57 | 1.03 |
| 1.05 | 0.81 | 1.20 |
| 0.95 | 1.04 | 1.38 |

These tests indicate the marked benefits produced by the present invention in permitting a higher rate of discharge for a given cathode area without reducing the closed circuit voltage below the cut off voltages required in devices using these batteries.

In addition to sulfur, selenium and tellurium in admixture with compounds yielding cuprous ions in acid or neutral solutions exhibit similar beneficial effects of more rapid activation rate, less overheating on discharge and higher voltages throughout discharge.

While cuprous chloride is preferable in practicing the invention, cuprous bromide and cuprous iodide are also suitable and may be employed. Similarly, complex compounds which release a preponderance of cuprous ions slowly in acid or neutral solutions may also be used in combinations with sulfur in the cathode of the present invention.

While magnesium and its alloys have been indicated as the most satisfactory anode material, it will be understood that the present invention also includes the use of anodes of zinc, aluminum and calcium and alloys thereof in conjunction with cathodes comprising mixtures of sulfur and compounds yielding cuprous ions in acid or neutral solutions.

I claim:

1. A deferred action water activated primary battery comprising an anode selected from the group consisting of magnesium, zinc, aluminum and calcium and a cathode comprising a mixture of graphite, a compound yielding cuprous ions in the presence of water and a material selected from the group consisting of sulfur, selenium and tellrium, said mixture in the presence of water producing an electrolyte which is acid or neutral, 2. A deferred action water activated primary battery comprising an anode consisting essentially of magnesium, and a cathode comprising a mixture of graphite, a compound selected from the group consisting of cuprous chloride, cuprous iodine and cuprous bromide, and a material selected from the group consisting of sulfur, selenium and tellurium, said mixture in the presence of water producing an electrolyte which is acid or neutral, 3. A deferred action water activated primary battery comprising an anode consisting essentially of magnesium, and a cathode comprising a mixture of graphite, cuprous chloride and sulfur, said mixture in the presence of water producing an electrolyte which is acid or neutral, 4. A deferred action water activated primary battery comprising a magnesium anode, and a cathode comprising a mixture of graphite, cuprous bromide and sulfur, said mixture in the presence of water producing an electrolyte which is acid or neutral, 5. A deferred action water activated primary battery comprising a magnesium anode, and a cathode comprising a mixture of graphite, cuprous iodide and sulfur, said mixture in the presence of water producing an electrolyte which is acid or neutral, 6. A deferred action water activated primary battery comprising a magnesium anode, and a cathode comprising a mixture of graphite and cuprous chloride mixed with from about 5% to about 40% by weight of sulfur, said mixture in the presence of water producing an electrolyte which is acid or neutral, 7. A deferred action water activated primary battery comprising a magnesium anode, and a cathode comprising a mixture of graphite and cuprous chloride mixed with about 30% by weight of sulfur, said mixture in the presence of water producing an electrolyte which is acid or neutral, 8. In a deferred action water activated primary battery a cathode comprising a mixture of graphite, cuprous chloride and sulfur, said mixture in the presence of water producing an electrolyte which is acid or neutral, 9. In a deferred action water activated primary battery having a magnesium anode and a separator, a cathode comprising a mixture of from about 5% to about 40% by weight of sulfur intimately mixed with cuprous chloride and graphite, said mixture in the presence of water producing an electrolyte which is acid or neutral, 10. In a deferred action water activated primary battery a cathode comprising a mixture of about 30% by weight of sulfur intimately mixed with cuprous chloride and graphite, said mixture in the presence of water producing an electrolyte which is acid or neutral.

References Cited by the Examiner

UNITED STATES PATENTS

| | | | |
|---|---|---|---|
| 2,636,060 | 4/53 | Fischbach et al. | 136—100 |
| 2,759,986 | 8/56 | Morehouse | 136—100 |
| 2,996,562 | 8/61 | Meyers | 136—6 |
| 2,997,518 | 8/61 | Klopp et al. | 136—90 |

OTHER REFERENCES

Kraus: The Properties of Electrically Conducting Systems, New York, 1922, page 314.

JOHN H. MACK, *Primary Examiner.*

JOHN R. SPECK, MURRAY TILLMAN, *Examiners.*